US008996556B2

(12) United States Patent
Ostrovsky et al.

(10) Patent No.: US 8,996,556 B2
(45) Date of Patent: Mar. 31, 2015

(54) PARALLEL PROCESSING OF AN ORDERED DATA STREAM

(75) Inventors: Igor Ostrovsky, Bellevue, WA (US); John Duffy, Renton, WA (US); Mike Liddell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 504 days.

(21) Appl. No.: 12/479,242

(22) Filed: Jun. 5, 2009

(65) Prior Publication Data

US 2010/0312801 A1    Dec. 9, 2010

(51) Int. Cl.
  *G06F 17/30*   (2006.01)

(52) U.S. Cl.
  CPC .... *G06F 17/30516* (2013.01); *G06F 17/30224* (2013.01)
  USPC .......................................... 707/764; 707/796

(58) Field of Classification Search
  CPC ................................................ G06F 17/30224
  USPC .................................................. 707/764, 796
  See application file for complete search history.

(56) References Cited

U.S. PATENT DOCUMENTS

| | | | |
|---|---|---|---|
| 4,380,046 A | 4/1983 | Frosch et al. | |
| 4,972,495 A * | 11/1990 | Blike et al. | 382/304 |
| 5,337,410 A | 8/1994 | Appel | |
| 5,353,418 A | 10/1994 | Nikhil et al. | |
| 5,890,154 A * | 3/1999 | Hsiao et al. | 1/1 |
| 6,049,861 A | 4/2000 | Bird et al. | |
| 6,314,501 B1 * | 11/2001 | Gulick et al. | 711/153 |
| 6,480,876 B2 | 11/2002 | Rehg et al. | |
| 6,738,379 B1 * | 5/2004 | Balazinski et al. | 370/394 |
| 2002/0107903 A1 * | 8/2002 | Richter et al. | 709/201 |
| 2004/0196905 A1 | 10/2004 | Yamane et al. | |
| 2004/0239981 A1 * | 12/2004 | Ducato et al. | 358/1.15 |
| 2005/0251040 A1 | 11/2005 | Relkuntwar et al. | |
| 2006/0117316 A1 * | 6/2006 | Cismas et al. | 718/103 |
| 2006/0253465 A1 * | 11/2006 | Willis et al. | 707/100 |
| 2008/0201613 A1 * | 8/2008 | Drepper | 714/38 |
| 2009/0007137 A1 | 1/2009 | Duffy et al. | |
| 2009/0249222 A1 * | 10/2009 | Schmidt et al. | 715/751 |

OTHER PUBLICATIONS

Ives, et al."Adapting to Source Properties in Processing Data Integration Queries", Retrieved at<<http://www.cs.washington.edu/homes/weld/papers/aqp04.pdf>>, SIGMOD 2004, Jun. 1318, 2004 Paris, France, pp. 12.

* cited by examiner

*Primary Examiner* — James Trujillo
*Assistant Examiner* — Grace Park

(57) ABSTRACT

A method of parallel processing an ordered input data stream that includes a plurality of input data elements and a corresponding plurality of order keys for indicating an ordering of the input data elements, with each order key associated with one of the input data elements, includes processing the input data stream in a parallel manner with a plurality of worker units, thereby generating a plurality of sets of output data elements. The plurality of sets of output data elements is stored in a plurality of buffers, with each buffer associated with one of the worker units. An ordered output data stream is output while the input data stream is being processed by outputting selected output data elements from the buffers in an order that is based on the order keys.

17 Claims, 4 Drawing Sheets

PARALLEL PROCESSING OF AN ORDERED DATA STREAM

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Data parallelism is a programming pattern where an operation is applied to input data, and the work is distributed across multiple computational cores by partitioning the input data and assigning different input elements to be processed by different cores. As a result of spreading the computation across multiple computational cores, the time to complete the computation is reduced.

One embodiment provides a method of parallel processing an ordered input data stream that includes input data elements and order keys for indicating an ordering of the input data elements. The input data stream is processed in a parallel manner with worker units to generate output data elements. The output data elements are stored in buffers associated with the worker units. An ordered output data stream is output while the input data stream is being processed by outputting selected output data elements from the buffers in an order that is based on the order keys.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
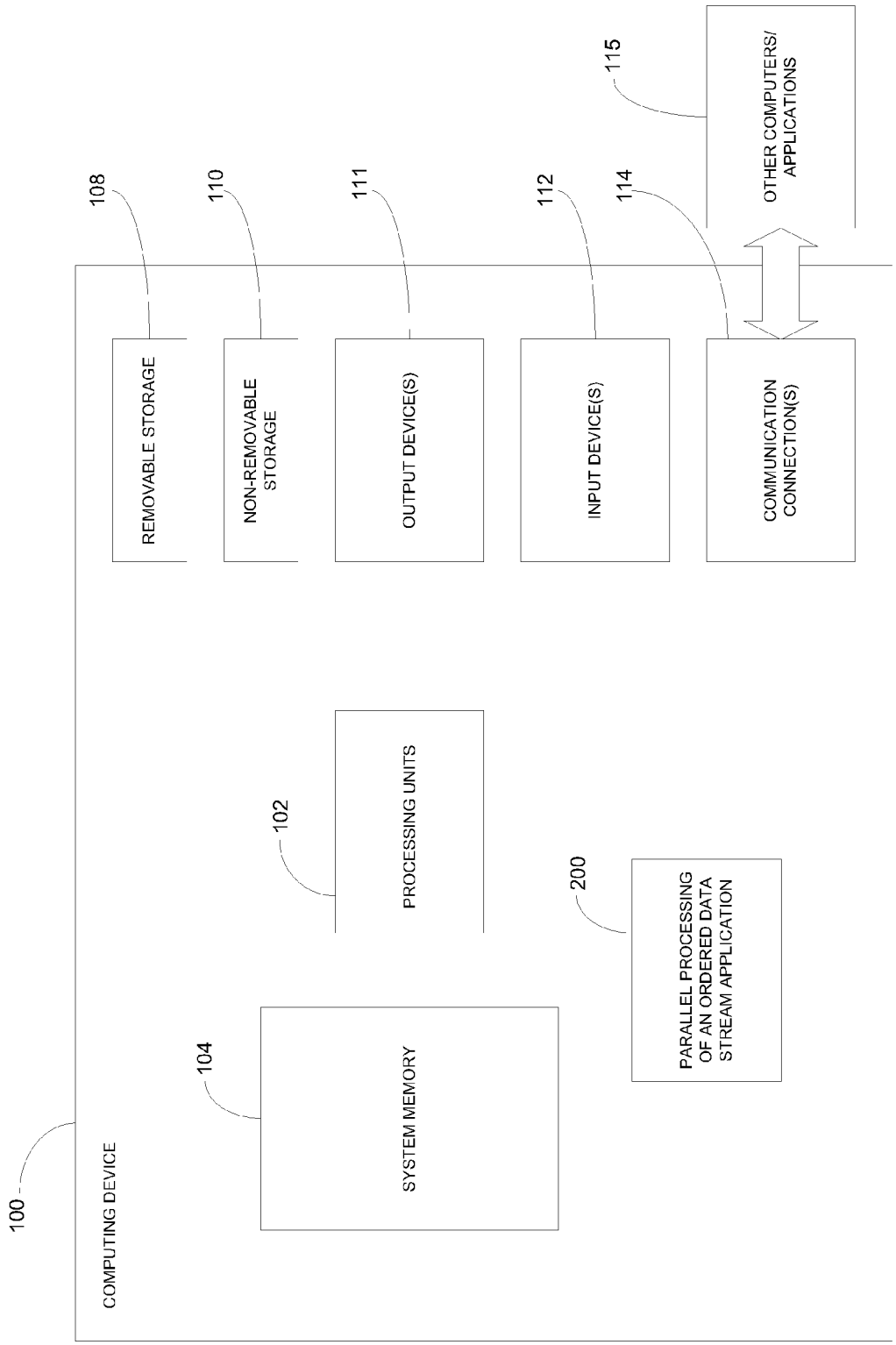
FIG. 1 is a diagram illustrating a computing system suitable for performing parallel processing of an ordered data stream according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a parallel processing of an ordered data stream application, but the technologies and techniques described herein also serve other purposes in addition to these. In one implementation, one or more of the techniques described herein can be implemented as features within a framework program such as Microsoft®.NET Framework, or within any other type of program or service.

In one embodiment, the ordered data streams processed by the ordered data stream processing application are identified by a user-specified query. A query may be constructed by a developer using a predefined query language. The developer then typically uses a compiler tool to translate the query into code that calls appropriate library functions to execute the query. One type of query is a language integrated query. In one embodiment, the queries analyzed by the ordered data stream processing application are language integrated queries. As an example, Microsoft® supports the LINQ (Language Integrated Query) programming model, which is a set of patterns and technologies that allow the user to describe a query that will execute on a variety of different execution engines. LINQ provides .NET developers with the ability to query and transform data streams using any of a variety of .NET programming languages.

In one embodiment, the queries analyzed by the ordered data stream processing application are data parallel language integrated queries that are configured to be executed in a parallel manner. Data parallelism is a programming pattern where an operation is applied to input data, and the work is distributed across multiple computational cores by assigning different input elements to be processed by different cores. As a result of spreading the computation across multiple computational cores, the time to complete the computation is reduced.

Writing data-parallel programs from scratch is a non-trivial programming problem, and can be simplified by building the solution on top of an existing data-parallel library. The library will provide various operators (e.g., projections, filters, joins, reductions, etc.) that the developer can combine to build data-parallel queries. Parallel LINQ (PLINQ) from Microsoft® is one such library. PLINQ accepts language integrated queries and automatically uses multiple processors or cores for execution when they are available.

Data parallel systems typically operate by partitioning input data into disjoint subsets (partitions) so that independent tasks of execution may process the separate subsets in isolation. The partitions are processed in parallel by multiple processors to generate a plurality of output sets. The output sets are merged back into a merged output set.

During the partitioning of an input sequence in a data parallel system, a situation may occur where the input sequence is partitioned non-contiguously, due to various practical concerns. For example, in an on-demand partitioning scheme, parts of the input may be dynamically assigned to partitions, in order to achieve load balancing if different elements of the input sequence involve different amounts of work. Since ordering of partitions does not directly correspond to ordering of the elements in the input, information about how different elements from different partitions were originally ordered against each other may become lost if it is not explicitly tracked in some way.

For example, consider the input sequence (7, 1, 2, 4, 3, 6), and a data-parallel filter operation that only keeps odd integers. Assume that the data parallel implementation splits the input into two partitions, (7, 2, 3) and (1, 4, 6). After applying the filter, the two output sets will be (7, 3) and (1). However, unless the information is remembered that the "1" was positioned between the "7" and the "3" in the original input, the filtered results may not be presented to the user in the order in which they appeared in the input.

In one embodiment, ordinal order indices are assigned to the elements of an input stream at the time that the stream is to be partitioned. The indices are maintained and tracked during parallel execution of a query, and used to produce a correctly ordered output data stream. An ordered data stream according to one embodiment is a data structure that stores a collection of data elements, as well as information that records their order. For example, to store the ordered data stream (5, 3, 5), the elements {3, 5, 5} are recorded, as well as the fact that the three is ordered between the two fives. In one embodiment, the ordering information is stored explicitly, in addition to the elements. For example, for each element, the ordered data stream will store an associated order key. Ordering of the order keys determines the ordering of their associated elements. For example, if the order key for element A comes before the order key for element B, then element A comes before element B in the element order.

FIG. 1 is a diagram illustrating a computing device 100 suitable for performing parallel processing of an ordered data stream according to one embodiment. In the illustrated embodiment, the computing system or computing device 100 includes a plurality of processing units 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media (e.g., computer-readable storage media storing computer-executable instructions for performing a method). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a parallel processing of an ordered data stream application 200. Parallel processing of an ordered data stream application 200 is described in further detail below with reference to FIG. 2.

Figure 2:
FIG. 2 is a diagrammatic view of a parallel processing of an ordered data stream application for operation on the computer system illustrated in FIG. 1 according to one embodiment.

FIG. 2 is a diagrammatic view of a parallel processing of an ordered data stream application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Parallel processing of an ordered data stream application 200 includes program logic 202, which is responsible for carrying out some or all of the techniques described herein. Program logic 202 includes logic 204 for processing an input data stream in a parallel manner with a plurality of worker units, and storing output data elements in a plurality of buffers; logic 206 for generating a data structure that tracks information to determine which of the buffers contains a next output data element to be output; logic 208 for identifying the next output data element to be output from the buffers based on the data structure, and removing the identified element from the buffer; logic 210 for updating the data structure after removing an output data element; logic 212 for outputting an ordered output data stream with a merge unit while the input data stream is being processed; logic 214 for causing the merge unit and the worker units to wait, and enter and exit a sleep state; logic 216 for determining whether a total number of data elements in each of the buffers exceeds a predetermined threshold; logic 218 for privatizing buffers and allocating new buffers; logic 220 for obtaining and releasing a lock on the input data stream; and other logic 222 for operating the application.

Figure 3:
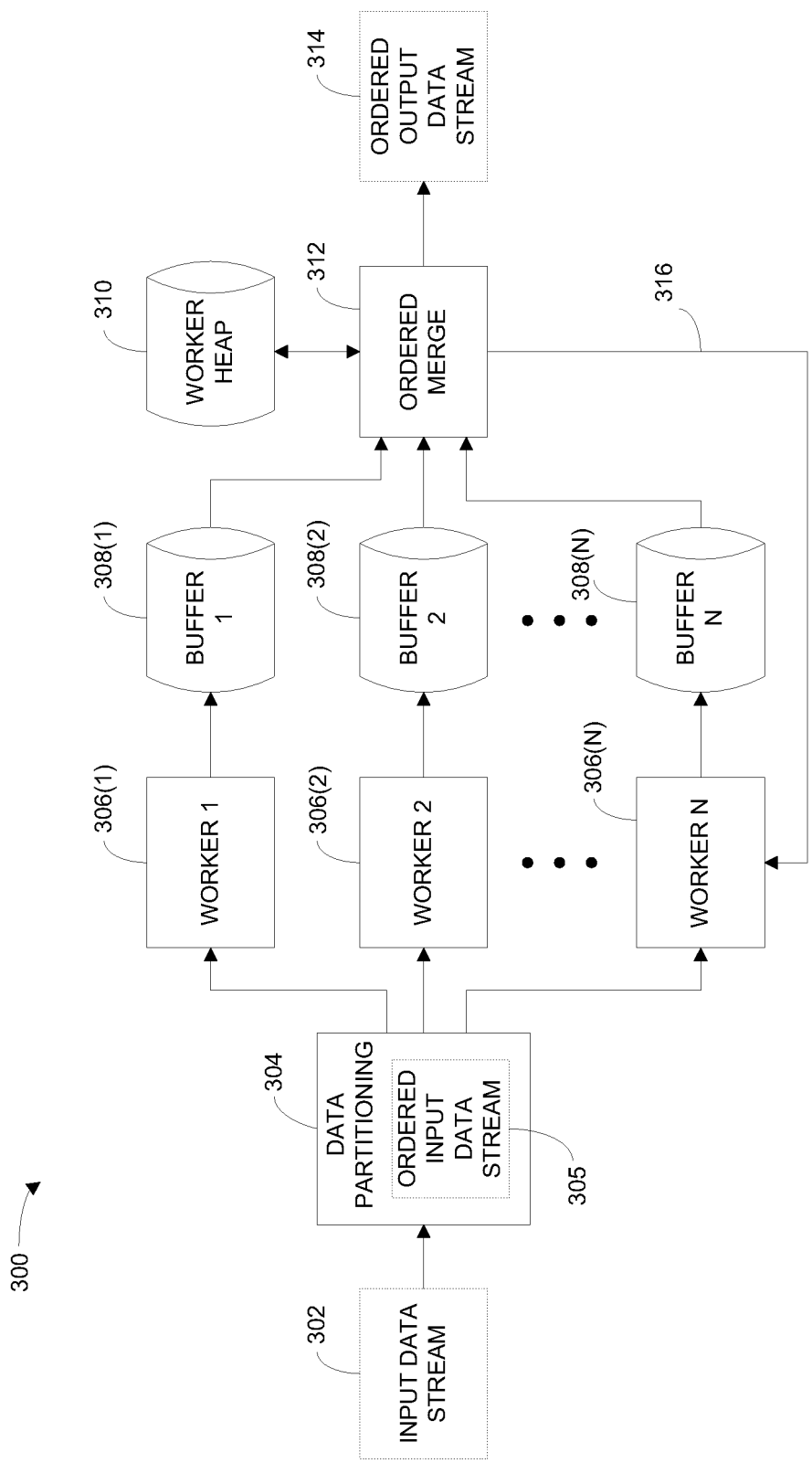
FIG. 3 is a block diagram illustrating a system for processing an ordered data stream in a parallel manner according to one embodiment.
Figure 4:
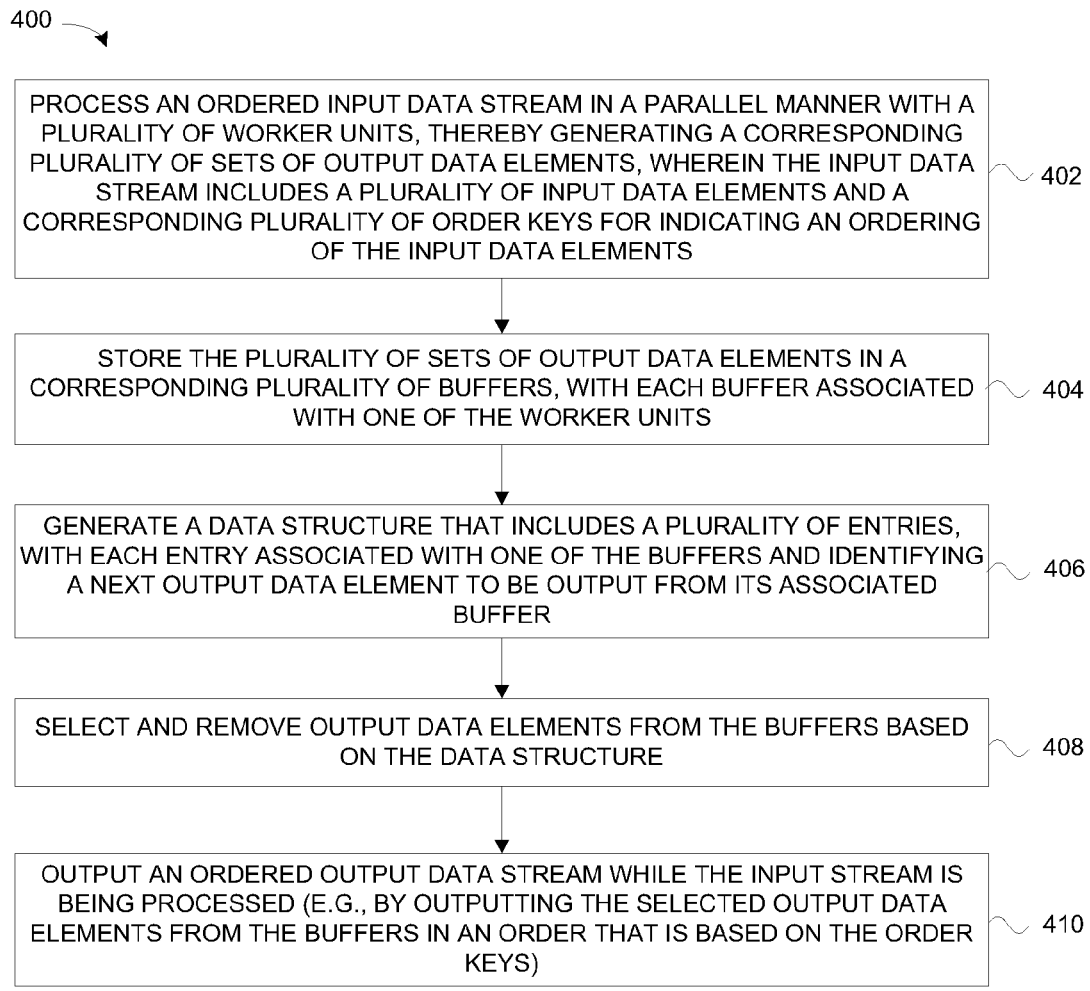
FIG. 4 is a flow diagram illustrating a method of parallel processing an ordered data stream according to one embodiment.

Turning now to FIGS. 3 and 4, techniques for implementing one or more embodiments of parallel processing of an ordered data stream application 200 are described in further detail. In some implementations, the techniques illustrated in FIGS. 3 and 4 are at least partially implemented in the operating logic of computing device 100.

FIG. 3 is a block diagram illustrating a system 300 for processing an ordered data stream in a parallel manner according to one embodiment. System 300 includes a data partitioning unit 304, a plurality of worker units 306(1)-306(N) (collectively referred to as worker units 306), a plurality of buffers 308(1)-308(N) (collectively referred to as buffers 308), a worker heap 310, and an ordered merge unit 312, where "N" in FIG. 3 according to one embodiment represents an integer greater than or equal to two.

In operation according to one embodiment, data partitioning unit 304 receives an input data stream 302 that includes a plurality of input data elements. In one embodiment, input data stream 302 comprises a complete set of data to be processed, and the complete set of data is available for immediate processing by system 300. In another embodiment, elements from input data stream 302 are provided to data partitioning unit 304 in a gradual manner (e.g., as the elements are being produced).

Data partitioning unit 304 according to one embodiment associates an order key with each data element in the input data stream 302, thereby producing an ordered input data stream 305. In one embodiment, the order keys are integers. In other embodiments, the order keys may be other types of values. The order keys according to one embodiment have two properties: (1) The order keys are comparable and form a total order; and (2) each data element is passed to the workers 306 in the order of non-decreasing order keys.

Data partitioning unit 304 partitions the ordered input data stream 305 into a plurality of partitions, which can then be processed independently in a parallel manner by the plurality of worker units 306. In one embodiment, each worker unit 306 corresponds to a different processing unit or thread in computing system 100. The worker units 306 according to one embodiment collaboratively take ownership of the input data elements in the ordered input data stream 305. In one embodiment, the ordered input data stream 305 is protected by a lock, and the worker units 306 in turn take the lock, pull one or more data elements and their associated order keys from the stream 305, and then release the lock.

Worker units 306 process the received input data elements, and produce corresponding output data elements, which are stored in buffers 308. In one embodiment, each of the worker units 306 has a corresponding buffer 308 for storing the output data elements produced by that worker unit 306. In one embodiment, for each input data element received by any given worker unit 306, the worker unit 306 produces one or more output data elements corresponding to that input data element. In another embodiment, the worker units 306 may not produce any output data elements for one or more of the input data elements. In one embodiment, for each output data element stored in the buffers 308, an order key is associated with the output data element (e.g., the same order key that is associated with the input data element corresponding to that output data element), and the order key is stored along with the output data element in the buffer 308.

The ordered merge unit 312 pulls output data elements and their associated order keys from buffers 308, and yields the output data elements in an ordered manner in the form of ordered output data stream 314 while the worker units 306 continue to process the ordered input data stream 305. In one embodiment, ordered merge unit 312 determines an order for outputting data elements in stream 314 based on the order keys of the data elements stored in the buffers 308 and based on information stored in the worker heap 310 managed by the ordered merge unit 312. In another embodiment, worker heap 310 may be replaced by another type of data structure other than a heap type of data structure, such as a balanced tree or an array.

In one embodiment, the worker heap 310 is used by the ordered merge unit 312 to identify the worker unit 306 whose next output data element is to be yielded, in accordance with the ordering established by the order keys. The worker heap 310 according to one embodiment indicates the order key of the next output data element to be yielded from each worker unit 306. In one embodiment, ordered merge unit 312 is a merge loop, and at each step of the merge loop, the worker heap 310 is used by the loop to find the worker unit 306 with the smallest order key to be yielded next, and then the output data element corresponding to that order key is yielded into the output stream 314. After yielding an output data element from a given worker unit 306, the ordered merge unit 312 updates the worker heap 310 to identify the order key of the next output data element from that same worker unit 306 to be yielded.

The worker heap 310 will now be described in further detail with reference to an example. Assume that system 300 includes three worker units 306 with three respective buffers 308, and the state of the buffers 308 at a particular point in time is as follows (with the values in each buffer 308 shown as pairs (order key, output data element)):

Buffer 1: (11, 'A'), (12, 'C'),
Buffer 2: (16, 'X')
Buffer 3: (9, 'D')

The worker heap 310 for this example according to one embodiment would appear as follows (shown as pairs (order key, buffer/worker index)): (9, 3), (11, 1), (16, 2). Thus, worker heap 310 according to one embodiment stores one entry for each worker unit 306 (and correspondingly for each buffer 308), with each entry indicating the order key of the next data element to be output from that worker's buffer 308 into the output data stream 314. The smallest order key in the worker heap 310 in the above example is 9, so ordered merge unit 312 will yield the corresponding element 'D' from buffer "3".

In one embodiment, when the ordered merge unit 312 empties out the buffer 308 of a particular worker unit 306, the ordered merge unit 312 waits for that worker unit 306 to produce its next output data element before yielding additional output data elements into the output data stream 314. Thus, in the example above, after yielding element 'D', buffer "3" becomes empty, and the ordered merge unit 312 waits for the worker 306 corresponding to buffer "3" to produce its next output data element in order to fill up the empty spot in the worker heap 310.

In one embodiment, the ordered merge unit 312 waits when the buffer 308 of any worker unit 306 becomes empty, even though buffers 308 of other worker units 306 may contain results. A reason for this is that the order keys according to one embodiment are implemented to have a total order, but may or may not be consecutive integers. Thus, in the example above, the output data element with order key "9" has been yielded into output data stream 314 from buffer "3", and buffers "1" and "2" are storing output data elements with order keys "11" and "16", respectively. Since the order keys are not constrained to be consecutive integers in one embodiment, it is not known whether the worker corresponding to buffer "3" is going to produce a result with an order key "10", or a larger order key. Thus, ordered merge unit 312 waits for the worker unit 306 corresponding to buffer "3" to produce its next output data element and store the element in buffer "3". In another embodiment, the order keys are implemented with consecutive integers, and the waiting can be reduced or eliminated.

In one embodiment, the ordered merge unit 312 and the worker units 306 follow a notification protocol and communicate with each other via communication link 316, so that the ordered merge unit 312 and the worker units 306 enter a wait state or sleep state and wake up at appropriate times. In one embodiment, when the buffer 308 of a given worker unit 306 becomes empty, ordered merge unit 312 notifies that worker unit 306 of this condition and ordered merge unit 312 enters a sleep state. When the worker unit 306 later produces an output data element and stores it in the worker's buffer 308

(i.e., so the buffer 308 is no longer empty), the worker unit 306 notifies the ordered merge unit 312 of this condition, and the unit 312 wakes up from the sleep state to process the next output data element. In one embodiment, when the total number of data elements in any buffer 308 exceeds a predetermined threshold, ordered merge unit 312 notifies the worker unit 306 associated with that buffer 308 of this condition, and the notified worker unit 306 enters a sleep state. When the total number of data elements in this buffer 308 later falls below the threshold, ordered merge unit 312 notifies the worker unit 306 associated with that buffer 308 of this condition, and the notified worker unit 306 wakes up from the sleep state and resumes processing input data elements.

In one embodiment, each time the ordered merge unit 312 pulls an output data element from the buffer 308 of a given worker unit 306, the ordered merge unit 312 synchronizes with that worker unit 306. In another embodiment, the worker units 306 each insert results in chunks of multiple data elements at a time in buffers 308, and the ordered merge unit 312 pulls entire chunks from the buffers 308 rather than pulling individual data elements. This effectively amortizes the cost of synchronization, but increases the latency of the result production.

In one embodiment, if the number of data elements in any buffer 308 exceeds a predetermined threshold, ordered merge unit 312 privatizes and takes ownership of that buffer 308, and allocates a new buffer 308 to replace the buffer 308 that it took. If the number of data elements in each of the buffers 308 does not exceed the threshold, ordered merge unit 312 continues to pull data elements from the buffer 308 one at a time, or in chunks, as described above.

If the worker units 306 produce results faster than the ordered merge unit 312 can consume them, the unbounded growth of the buffers 308 may degrade the performance. One embodiment uses worker throttling to solve this issue. In one embodiment, each worker unit 306 is configured to wait on the ordered merge unit 312 if that worker's buffer 308 exceeds a predetermined threshold, and then resume producing output data elements when the buffer 308 falls below the threshold.

FIG. 4 is a flow diagram illustrating a method 400 of parallel processing an ordered input data stream according to one embodiment. In one embodiment, the ordered input data stream in method 400 includes a plurality of input data elements and a corresponding plurality of order keys for indicating an ordering of the input data elements, with each order key associated with one of the input data elements. At 402 in method 400, the input data stream is processed in a parallel manner with a plurality of worker units, thereby generating a corresponding plurality of sets of output data elements. At 404, the plurality of sets of output data elements is stored in a corresponding plurality of buffers, with each buffer associated with one of the worker units. At 406, a data structure is generated that includes a plurality of entries, with each entry associated with one of the buffers and identifying a next output data element to be output from its associated buffer. In one embodiment, the data structure generated at 406 is a heap data structure. In other embodiments, another type of data structure may be used. At 408, output data elements to be output from the buffers are selected and removed based on the data structure generated at 406. At 410, an ordered output data stream is output while the input data stream is being processed (e.g., by outputting the selected output data elements from the buffers in an order that is based on the order keys).

In one embodiment, each entry in the data structure generated at 406 includes a value identifying an order key, and at each iteration, the following occurs: The entry with the smallest order key is identified; one of the output data elements in the buffer associated with the identified entry is identified based on the smallest order key; and the identified output data element is output from the buffer and into the ordered output data stream. In one embodiment, at each iteration, the identified entry is updated to identify a next output data element to be output from its associated buffer.

In one embodiment, method 400 uses an ordered merge unit that is configured to wait to output data elements from all of the buffers when any of the buffers becomes empty. In one embodiment, the outputting of an ordered output data stream at 410 is performed by the ordered merge unit, which enters a sleep state when any of the buffers becomes empty. In one embodiment, the input data elements from the input data stream in method 400 are provided to the worker units in a gradual manner and not all at one time. In one embodiment, the order keys in method 400 are non-consecutive integers. In one embodiment, the outputting selected output data elements from the buffers at 410 comprises outputting selected chunks of output data elements from the buffers, wherein each chunk includes a plurality of data elements.

In one embodiment of method 400, it is determined whether a total number of data elements in a first one of the buffers exceeds a predetermined threshold, and the first buffer is privatized and a new buffer is allocated to replace the first buffer when it is determined that the total number of data elements in the first buffer exceeds the predetermined threshold. In one embodiment, the worker unit associated with the first buffer waits to process additional input data elements from the input data stream when it is determined that the total number of data elements in the first buffer exceeds the predetermined threshold, and resumes processing input data elements from the input data stream when the total number of data elements in the first buffer falls below the predetermined threshold. In one embodiment, the worker unit associated with the first buffer enters a sleep state when it is determined that the total number of data elements in the first buffer exceeds the predetermined threshold.

In one embodiment of method 400, a lock is obtained on the input data stream by a first one of the worker units, and at least one input data element is pulled from the input data stream while the lock is held by the first worker unit. The lock on the input data stream is released after the at least one input data element is pulled from the input data stream.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of parallel processing an ordered input data stream that includes a plurality of input data elements and a corresponding plurality of order keys for indicating an ordering of the input data elements, each order key associated with one of the input data elements, the method comprising:

storing the ordered input data stream, including storing as part of the input data stream an order key for each of the input data elements, wherein the order keys indicate a total order of all of the input data elements in the ordered input data stream;

processing the stored ordered input data stream in a parallel manner with a plurality of worker units, thereby generating a plurality of sets of output data elements;

storing the plurality of sets of output data elements in a plurality of buffers along with an associated order key for each output data element, each buffer associated with one of the worker units;

outputting an ordered output data stream while the input data stream is being processed in a parallel manner with the plurality of worker units by outputting selected output data elements from the plurality of buffers in an order that is based on the order keys stored in the plurality of buffers;

generating a data structure that includes a plurality of entries, each entry associated with one of the buffers and identifying a next output data element to be output from its associated buffer based on the order keys stored in the buffers; and selecting output data elements to be output from the buffers based on output data elements identified by the data structure.

2. The method of claim 1, wherein the data structure is a heap data structure.

3. The method of claim 1, wherein each entry includes a value identifying one of the order keys stored in the plurality of buffers.

4. The method of claim 3, and further comprising:

identifying one of the entries in the data structure that has a smallest order key;

identifying one of the output data elements in the buffer associated with the identified entry based on the smallest order key; and outputting the identified output data element into the ordered output data stream.

5. The method of claim 4, and further comprising:

updating the identified entry to identify a next output data element to be output from its associated buffer.

6. The method of claim 1, and further comprising:

waiting to output data elements from all of the buffers when any of the buffers becomes empty.

7. The method of claim 6, wherein the outputting of an ordered output data stream is performed by a merge unit, and wherein the method further comprises:

causing the merge unit to enter a sleep state when any of the buffers becomes empty.

8. The method of claim 1, wherein input data elements from the input data stream are provided to the worker units in a gradual manner and not all at one time.

9. The method of claim 1, wherein the order keys are non-consecutive integers.

10. The method of claim 1, wherein outputting selected output data elements from the buffers comprises outputting selected chunks of output data elements from the buffers, wherein each chunk includes a plurality of data elements.

11. The method of claim 1, and further comprising:

determining whether a total number of data elements in a first one of the buffers exceeds a predetermined threshold; and privatizing the first buffer and allocating a new buffer to replace the first buffer when it is determined that the total number of data elements in the first buffer exceeds the predetermined threshold.

12. The method of claim 1, and further comprising:

determining whether a total number of data elements in a first one of the buffers exceeds a predetermined threshold; and waiting to process additional input data elements from the input data stream by the worker unit associated with the first buffer when it is determined that the total number of data elements in the first buffer exceeds the predetermined threshold.

13. The method of claim 12, and further comprising:

resuming processing of input data elements from the input data stream by the worker unit associated with the first buffer when the total number of data elements in the first buffer falls below the predetermined threshold.

14. The method of claim 12, and further comprising:

causing the worker unit associated with the first buffer to enter a sleep state when it is determined that the total number of data elements in the first buffer exceeds the predetermined threshold.

15. The method of claim 1, and further comprising:

obtaining a lock on the input data stream with a first one of the worker units;

pulling at least one input data element from the input data stream while the lock is held by the first worker unit; and releasing the lock on the input data stream after pulling the at least one input data element from the input data stream.

16. A computer-readable storage medium storing computer-executable instructions for performing a method of parallel processing an ordered input data stream that includes a plurality of input data elements and a corresponding plurality of order keys for indicating an ordering of the input data elements, each order key associated with one of the input data elements, the method comprising:

storing the ordered input data stream, including storing as part of the input data stream an order key for each of the input data elements, wherein the order keys indicate a total order of all of the input data elements in the ordered input data stream;

processing the stored ordered input data stream in a parallel manner with a plurality of worker units, thereby generating a corresponding plurality of sets of output data elements;

storing the plurality of sets of output data elements in a corresponding plurality of buffers along with an associated order key for each output data element, each buffer associated with one of the worker units;

outputting an ordered output data stream while the input data stream is being processed in a parallel manner with the plurality of worker units by outputting selected output data elements from the plurality of buffers in an order that is based on the order keys stored in the plurality of buffers;

generating a data structure that includes a plurality of entries, each entry associated with one of the buffers and identifying a next output data element to be output from its associated buffer based on the order keys stored in the buffers; and selecting output data elements to be output from the buffers based on output data elements identified by the data structure.

17. The computer-readable storage medium of claim 16, wherein the method further comprises:

waiting to output data elements from all of the buffers when any of the buffers becomes empty.

* * * * *